Patented Aug. 5, 1952

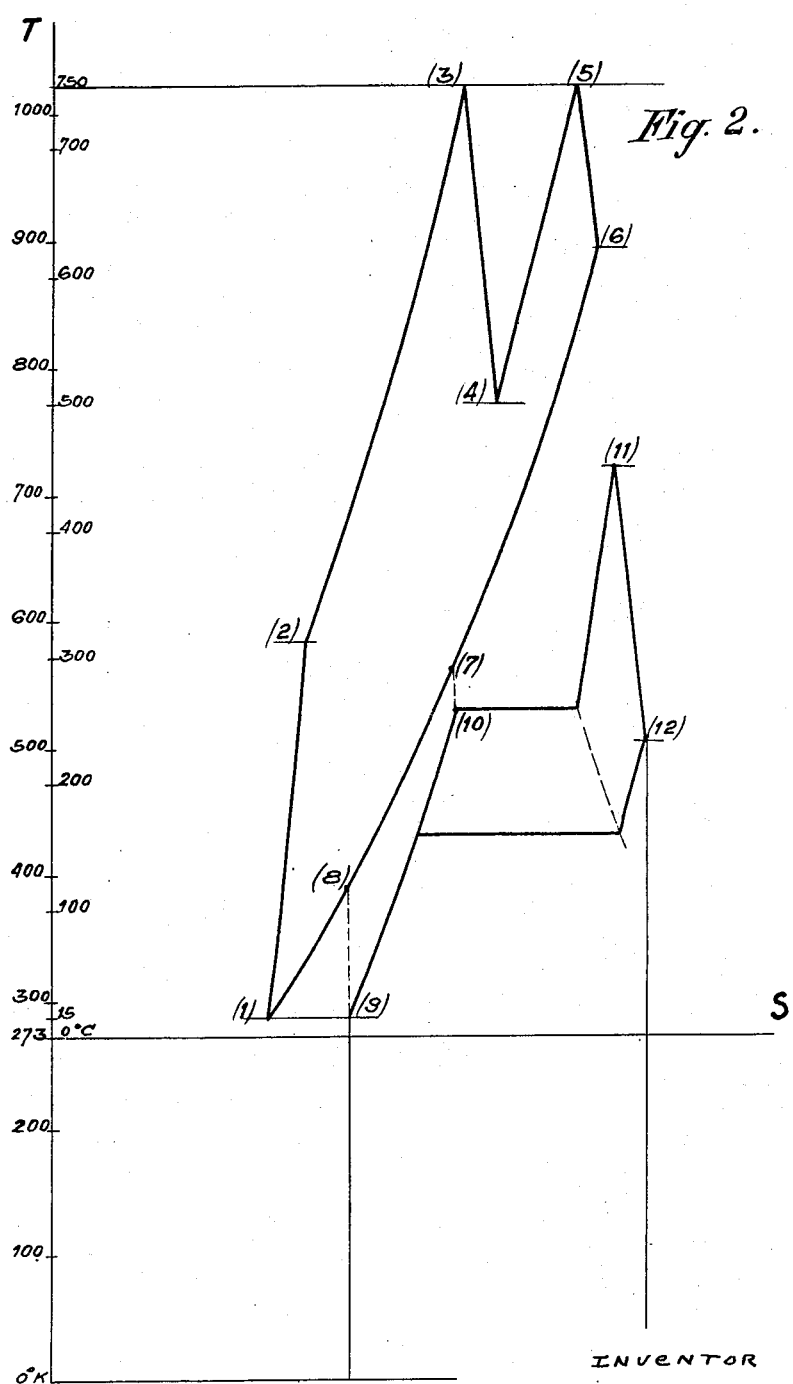

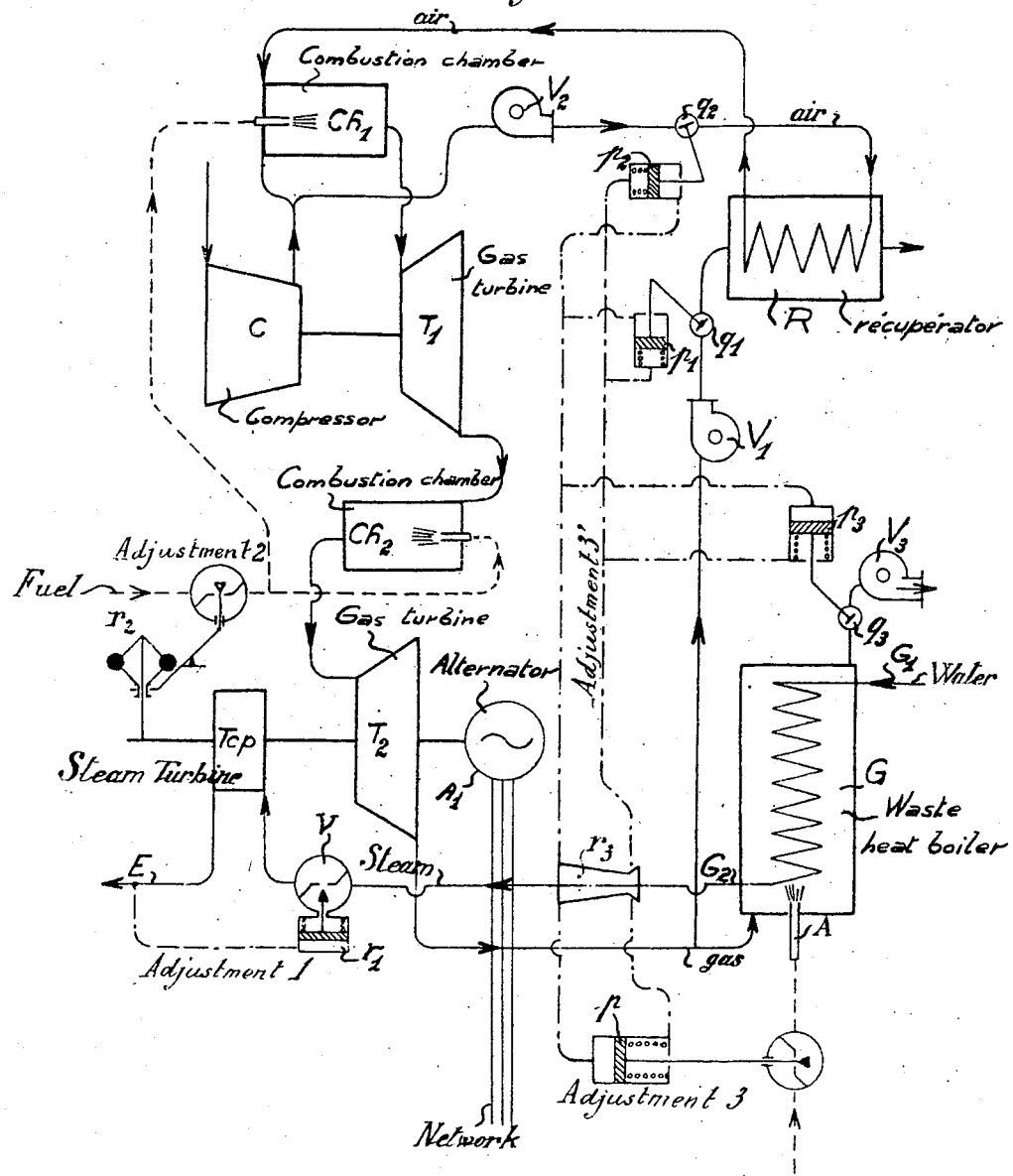

2,605,610

UNITED STATES PATENT OFFICE 2,605,610

MULTIPLE GAS TURBINE POWER PLANT SUPPLYING WASTE HEAT TO AN AIR PREHEATER AND A BOILER IN PARALLEL

Louis A. Hermitte and Marcel H. L. Sédille, Paris, France, assignors to Societe Rateau (Société Anonyme), Paris, France, a company of France, and Rene Anxionnaz, Paris, France, jointly Application September 2, 1947, Serial No. 771,668
In France September 3, 1946

3 Claims. (Cl. 60—39.18)

It is a well known fact that it is possible to use the exhaust gases from a gas turbine in a waste heat boiler with a view to producing steam, which latter may be used for instance for heating purposes. Said steam may also be produced under pressure and be caused to expand first in a counterpressure steam turbine inside which it produces a certain amount of supplementary energy after which the steam is used for heating purposes.

Our invention has for its object an arrangement of this type designed so as to produce as much energy as possible for a given amount of heat units in order to provide for an optimum efficiency, taking into account the possibilities of the gas turbines now in use, such as a temperature consistent with a proper mechanical behaviour of the apparatuses and the individual efficiencies of the machines. Our invention covers also the arrangements provided for obtaining operation under the best conditions possible in case of any lack of equilibrium as concerns the requirements in delivery of energy or steam heating and it covers lastly the adjustment of the system for the different cases to be considered.

One object of our invention, is to provide a plant of the kind referred to with an auxiliary heating device such as a burner located in the waste heat boiler and designed for the satisfaction of any extra requirements as to steam, together with an arrangement for satisfying any requirements as to excess energy in addition to those corresponding to steam heating. This arrangement includes a recuperator inserted in parallel with the boiler for heating the output of the air compressor through the agency of exhaust gases and fans for adjusting the outputs of air and gases with reference to one another.

The following description and accompanying drawings given by way of examples and by no means in a binding sense will allow a better understanding of our invention.

Fig. 2 illustrates diagrammatically the heat cycle applied.

Fig. 3 shows a modification for allowing the obtention under the best conditions possible of any extra energy or steam for heating purposes.

Figure 1:
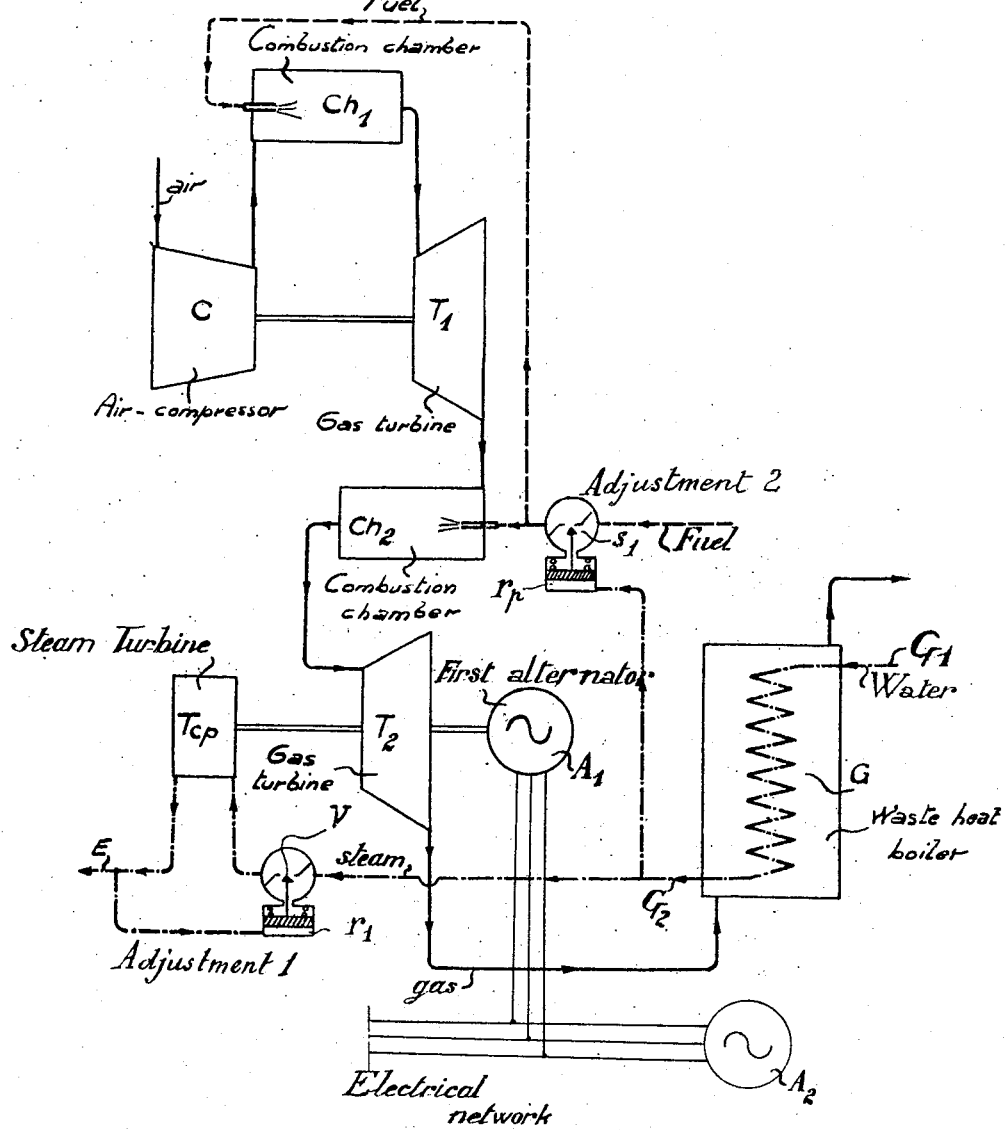
Figures 1, 1b, 1c are illustrations of embodiments comprising a gas turbine associated according to our invention with a secondary cycle for recovering heat and producing steam for heating purposes.
Figure 1B:
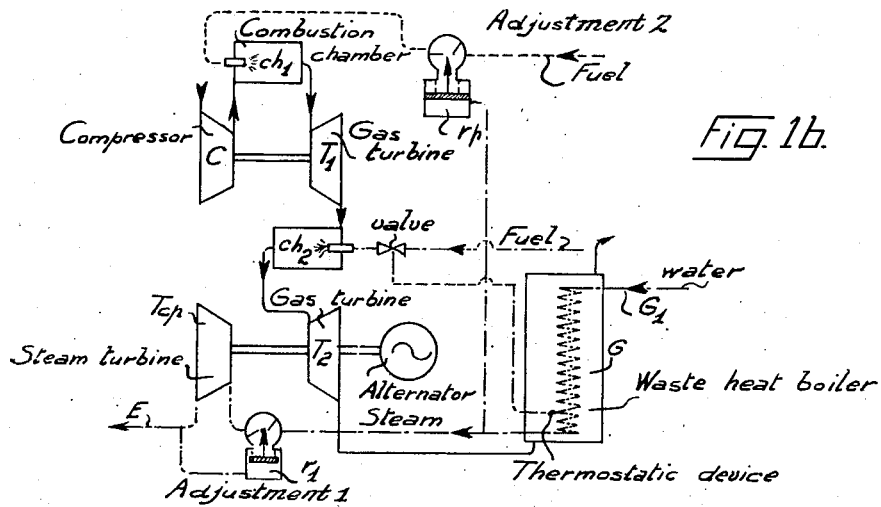

In the embodiment illustrated in Fig. 1, the unit includes chiefly an air compressor C, a combustion chamber $CH_1$ operating under constant pressure, a gas turbine $T_1$ operating under high pressure and adapted to drive the compressor C, a second combustion chamber $Ch_2$ for superheating again the exhaust gases from the turbine $T_1$ and lastly another gas turbine $T_2$ for delivering external power. Said turbine $T_2$ may drive for instance an alternator or a generator $A_1$. The gases at the output of the last turbine $T_2$ pass through a waste heat boiler G vaporizing the water entering at $G_1$. The steam produced at $G_2$ may be at a pressure and at a temperature that are more or less high according to the characteristics of the exhaust gases passing out of the turbine $T_2$. It may be superheated.

The compression of air in the stages of the compressor C is not provided with any cooling means. If such a cooling were performed it would constitute as a matter of fact a loss of heat units to the cold source which would reduce the general efficiency, said efficiency "$\rho$" being defined by the ratio $$\rho = \frac{\text{heat units corresponding to the mechanical work provided and heat units available for heating at G}}{\text{heat units corresponding to the fuel expenditure}}$$

By way of example, the compressor has been shown as single but it may as well include a plurality of compressor bodies controlled by separate turbines with at the most as many intermediary reheating means.

The gas turbine cycle illustrated includes reheating means operating during expansion (chamber $Ch_2$). This arrangement is used in order to obtain at the exhaust sufficiently hot gases with the object of producing steam with a certain amount of superheat while increasing at the same time as much as possible the amount of energy produced by the gas turbine.

By way of example, the driving turbine $T_2$ has been illustrated as single. It may also include a plurality of bodies with at the utmost as many intermediary reheating means.

The steam generated in the waste heat boiler G is directed towards a counter-pressure turbine Tcp, which latter may be coupled directly or through the agency of a gearing with the gas-driving turbine $T_2$. The exhaust steam at the output of the counter pressure turbine Tcp is directed into the pipe E leading it to any point at which it is used for heating purposes.

The evolution of the gas-steam cycle on the temperature-entropy diagram T S of Figure 2 may be disclosed as follows:

From 1 to 2 the combustive air is compressed without any cooling in the compressor C, from 2 to 3 the combustion is operated under constant pressure in the combustion chamber $Ch_1$, from 3 to 4 the expansion is provided in the high pressure gas turbine $T_1$, from 4 to 5 the gases are reheated in the combustion chamber $Ch_2$, from 5 to 6 they are expanded in the driving gas turbine $T_2$; from 6 to 7 part of the residual heat of the gases is used for vaporizing and superheating the steam, from 7 to 8 said residual heat of the gases is used for heating the water up to boiling temperature and from 8 to 1 the gases lose their residual heat at the cold source.

As concerns the steam phase, the cycle described is as follows:

From 9 to 10 the water is heated up to boiling temperature, from 10 to 11 it is vaporized at constant temperature while the steam is superheated, from 11 to 12 the steam is expanded in the counter pressure turbine Tcp down to the pressure adapted for use in the heating circuit E.

If the requirements of heating steam are too considerable it is necessary to provide a supplement of heat units for the waste heat boiler G. To this purpose, a supplementary amount of fuel is burnt in the boiler for instance by means of a burner A (Fig. 3). No complementary amount of combustion air is necessary as the combustion in the combustion chambers $Ch_1$ and $Ch_2$ is always performed with a large excess of air whereby the gases passing through the boiler contain air.

In order that the plant may satisfy any extra requirements as to energy it would be possible either:

(a) According to a first procedure, to use as precedingly a supplementary burner in the waste heat boiler G and instead of the counter-pressure steam turbine Tcp a steam turbine provided with drawing off means, inside which the excess of steam generated in the boiler may expand into a condenser.

(b) Or else while avoiding the incorporation of a supplementary burner to increase the output of gas provided by the gas turbine set, said procedure allowing the production of a supplement of energy partly through the gas cycle and partly through the steam cycle.

The two above procedures would lead to using a turbine with drawing off means and require essentially the presence of the usual condensation auxiliaries forming part of steam cycles.

Our invention allows doing away with such condensation means. As a matter of fact all the excess energy is provided through the gas cycle (Fig. 3). To obtain the optimum efficiency, the excess gases do not pass through the boiler, but are used for heating the air after compression inside a heat recuperator R through which a more or less important amount of combustive air is caused to pass, which combustive air is taken off the output of the compressor C and is then, after heating at R, directed to the combustion chamber $Ch_1$.

In order to overcome the losses of load and adjusting the output of gas and air which are to pass through the recuperator R and the waste heat boiler G, it is necessary to insert a circulating fan in each circuit; in other words (Fig. 3) a fan $V_1$ is inserted in the gas circuit feeding the recuperator R, a fan $V_2$ in the circuit of the air passing through said recuperator and a fan $V_3$ in the circuit of the exhaust gases of the waste heat boiler G. The adjustment of the different arrangements described precedingly may be executed as follows:

(1) Adjustment of the plant in the case where the alternator $A_1$ driven by the turbine $T_2$ feeds together with other synchronous alternators such as $A_2$ a general distribution network (Fig. 1).

(a) The output of steam is adjusted in the same manner as in any counter pressure plant in the case where the alternator is coupled with the network, that is to say through the agency of a gate or valve V controlled by a pressure regulator $r_1$ inserted in the heating pipe (adjustment 1, the speed regulator mounted on the turbine serving only for putting the group into step.

(b) The adjustment of the gas output sent into the waste heat boiler G for obtaining the weight of steam required by the turbine Tcp and by the heating devices fed by the pipe E is performed in a manner similar to that used with ordinary steam boilers, but in the present case instead of acting on a boiler furnace or on the admission of fuel to such a furnace, the adjustment is obtained through a simultaneous action on the burners in both combustion chambers $Ch_1$ and $Ch_2$ (adjustment 2).

The adjustment of the burners in the chambers $Ch_1$ and $Ch_2$ modifies simultaneously the gas output and their temperature of admission into the boiler G.

However it may be stated that the adjustment of the burner of the chamber $Ch_1$ acts chiefly on the variation in speed of the compressor C and consequently on the output of the gases, while the adjustment of the burner of the chamber $Ch_2$ acts more on the temperature of the exhaust gases from the gas unit.

The adjustment of these two burners may therefore be associated in a manner such as to obtain a modification in the output of the gases while holding constant their temperature at their admission into the boiler, whereby it is possible to maintain at substantially constant value the superheat temperature of the steam.

In the embodiment of Fig. 1 the variation in pressure of the steam at the output of the waste heat boiler G is used for acting on the admission of fuel to the burners of the chambers $Ch_1$ and $Ch_2$. To this purpose a manometric capsule $r_p$ acts on the adjusting valve $s_1$ inserted in the common fuel pipe feeding the burners, the openings of which are selected so as to provide for instance a constant ratio between the outputs of the two burners.

For sake of simplicity, it is possible also if desired to act only on the burner of the combustion chamber $Ch_1$ from the usual heating regulator and to retain constancy of the temperature of the superheated steam by acting on the burner of the combustion chamber $Ch_2$ through the agency of a thermostat located in the boiler, as illustrated on Fig. 1.

Figure 1C:
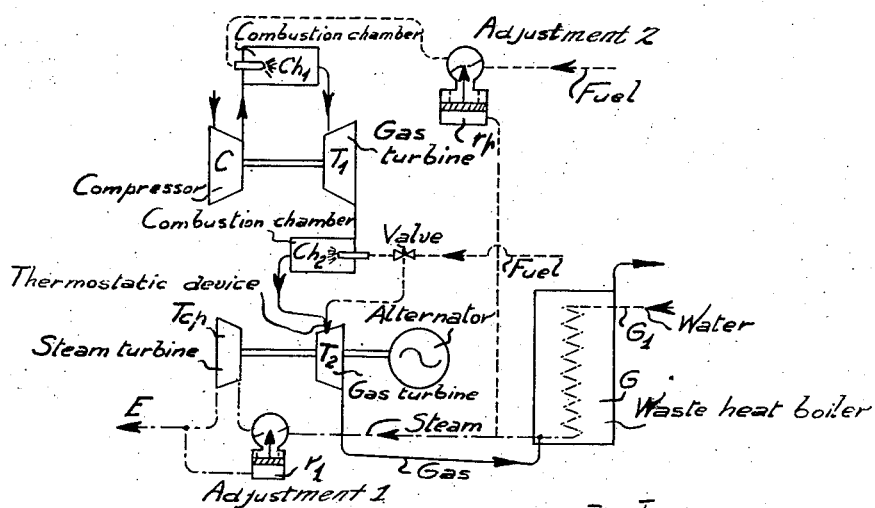

As a modification, it is also possible by means of a thermostat acting on the fuel output in the chamber $Ch_2$ to keep up a constant temperature at the admission into the driving turbine $T_2$ while allowing a slight variation in the superheating, as illustrated on Fig. 1c.

(2) Adjustment of the combined unit operating independently in the case of an extra requirement of steam (Fig. 3).

In this case, the heating steam output is adjusted through the usual well known means under the action of the pressure in the heating pipe E (adjustment 1).

The variation in the steam output obtained through this adjustment modifies the speed of the turbine shafts and said speed is returned to the desired value through a speed-responsive device $r_2$ acting on the injection of fuel into the fuel combustion chambers $Ch_1$ and $Ch_2$, the output of gas being thus modified.

In order to obtain the supplementary amount of steam there is admitted as described precedingly a supplementary amount of fuel to the waste heat boiler through the burner A. The adjustment of this supplementary amount of fuel (adjustment 3) is obtained through the variation in the output of steam passing through the steam turbine Tcp. To this end a convergent-divergent nozzle $r_3$ as used in the well known output meters is inserted in the piping which leads the steam to the turbine Tcp. Any variation of the output through the said nozzle produces a variation in the difference between the pressures of the steam at the outlet and at the inlet of the nozzle. The said pressures act differentially on a piston $p$ operating a valve which in turn adjusts the output of fuel feeding the burner A.

(3) Adjustment of a combined unit operating independently in the case of a requirement for extra energy (Fig. 3).

In this particular case, the adjustments 1 and 2 are retained while the adjustment 3 is substituted by the adjustment 3' according to which the steam pressures at the inlet and at the outlet of the nozzle $r_3$ act differentially on piston $p_1$, $p_2$, $p_3$ operating valves $q_1$, $q_2$, $q_3$ which control the output of the three auxiliary fans $V_1$, $V_2$, $V_3$, in order to adjust on one hand the amount of air and gas passing through the heat recuperator R and on the other hand the throughput of gas passing through the waste heat boiler G.

It is understood that both the adjustments 3 and 3' may coexist on the same plant, and may be operative at the same time, in case an extra requirement of both steam and energy occurs.

What we claim is:

1. A gas turbine plant adapted for the simultaneous production of heat and energy, comprising an air compressor, at least one combustion chamber supplied with compressed air by said compressor, fuel feeding means for said combustion chamber, at least one gas turbine fed with gas through said combustion chamber, a waste heat boiler adapted to produce steam under pressure and at high temperature, piping means for heating said boiler through the exhaust gases from said gas turbine, a counter-pressure steam turbine fed by said boiler for delivering mechanical power and expanded steam available for heating purposes, a heat recuperator fed in parallel with the boiler by the gas turbine exhaust, piping means for leading to said recuperator a variable part of the air delivered by said compressor and for leading the air thus heated from said recuperator to said combustion chamber, control means responsive to the counter-pressure of the steam exhausting from said steam turbine for adjusting the output of steam delivered to the same turbine by said boiler, control means for adjusting the heat output of said combustion chamber and control means responsive to the rate of steam flow fed to said steam turbine for adjusting the relative output of air and gas passing through said recuperator.

2. A gas turbine plant adapted for the simultaneous production of heat and energy, comprising an air compressor, at least one combustion chamber supplied with compressed air by said compressor, fuel feeding means for said combustion chamber, at least one gas turbine fed with gas through said combustion chamber, a waste heat boiler adapted to produce steam under pressure and at high temperature, piping means for heating said boiler through the exhaust gases from said gas turbine, a counter-pressure steam turbine fed by said boiler for delivering mechanical power and expanded steam available for heating purposes, auxiliary heating means for said boiler for producing extra amounts of steam, fuel feeding means for said auxiliary heating means, a heat recuperator fed in parallel with the boiler by the gas turbine exhaust, piping means for leading to said recuperator a variable part of the air delivered by said compressor and for leading the air thus heated from said recuperator to said combustion chamber, control means responsive to the counter-pressure of the steam exhausting from said steam turbine for adjusting the output of steam delivered to the same turbine by said boiler, a speed responsive device adapted to maintain constant the speed of the steam turbine through action on the fuel feeding means of said combustion chamber, control means responsive to the rate of steam flow fed to said steam turbine for adjusting the relative output of air and gas passing through said recuperator, and a regulator responsive to the rate of steam flow into said steam turbine for adjusting the heat output of said auxiliary heating means of the boiler.

3. In a plant adapted for the simultaneous production of heat and energy, the combination of a hot gas line with at least one controllable fuel burning device inserted in said line for heating the gases passed therethrough, an air compressor for delivering air under pressure into said line, a gas turbine driven by said hot gases inserted in said line and coupled with said compressor for driving it, another gas turbine inserted in said hot gas line mechanically independent of the first one for delivering external power, a waste heat boiler inserted in said gas line to be heated at least partly by said gases, a counter-pressure steam turbine fed by said boiler for delivering external power and expanded steam, a heat recuperator inserted in parallel with said boiler in the gas line for heating a variable part of the air delivered by said compressor, control means responsive to the counter-pressure of the steam exhausting from said steam turbine for adjusting the output of steam delivered to the same turbine by said boiler, control means for adjusting the heat output of said burning device and control means responsive to the rate of steam flow fed to said steam turbine for adjusting the relative output of air and gas passing through said recuperator.

LOUIS A. HERMITTE.
MARCEL H. L. SÉDILLE.

REFERENCES CITED

The following references are of record in the file of this patent:

UNITED STATES PATENTS

| Number | Name | Date |
|---|---|---|
| 1,783,204 | Wettstein | Dec. 2, 1930 |
| 1,978,837 | Forsling | Oct. 30, 1934 |
| 2,067,834 | Erickson et al. | Jan. 12, 1937 |
| 2,428,136 | Barr | Sept. 30, 1947 |

FOREIGN PATENTS

| Number | Country | Date |
|---|---|---|
| 151,041 | Switzerland | Feb. 16, 1932 |

OTHER REFERENCES

V. D. I. Zeitschrift, Bd. 83, Nr. 21, issue of May 27, 1939, page 666.